United States Patent
Hayase et al.

(10) Patent No.: US 9,341,106 B2
(45) Date of Patent: May 17, 2016

(54) COOLING APPARATUS FOR ENGINE SYSTEM AND CONTROL METHOD THEREFOR

(71) Applicants: Yuichiro Hayase, Toyota (JP); Takahiro Sadamitsu, Miyoshi (JP)

(72) Inventors: Yuichiro Hayase, Toyota (JP); Takahiro Sadamitsu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/421,710

(22) PCT Filed: Jun. 17, 2013

(86) PCT No.: PCT/JP2013/066613
§ 371 (c)(1),
(2) Date: Feb. 13, 2015

(87) PCT Pub. No.: WO2014/203312
PCT Pub. Date: Dec. 24, 2014

(65) Prior Publication Data
US 2015/0219002 A1 Aug. 6, 2015

(51) Int. Cl.
*F01P 3/12* (2006.01)
*F01P 7/14* (2006.01)
(Continued)

(52) U.S. Cl.
CPC ... *F01P 3/20* (2013.01); *F01P 5/10* (2013.01); *F01P 7/14* (2013.01); *F01P 7/165* (2013.01); *F02B 37/00* (2013.01); *F02B 39/005* (2013.01); *F02B 39/16* (2013.01); *F01P 2007/146* (2013.01); *F01P 2050/22* (2013.01); *F01P 2060/12* (2013.01)

(58) Field of Classification Search
CPC ............ F01P 3/20; F01P 5/10; F01P 7/14; F01P 7/165; F01P 2007/146; F01P 2050/22; F01P 2060/12; F02B 37/00; F02B 39/005; F02B 39/16
USPC .................. 60/286, 298, 320, 605.3
See application file for complete search history.

(56) References Cited

U.S. PATENT DOCUMENTS

| | | | |
|---|---|---|---|
| 2004/0055283 A1 | 3/2004 | Iihoshi et al. | |
| 2008/0264609 A1* | 10/2008 | Lutz | F02M 25/0727 165/104.19 |

(Continued)

FOREIGN PATENT DOCUMENTS

| | | |
|---|---|---|
| JP | H07-49036 A | 2/1995 |
| JP | 2004-116310 A | 4/2004 |

(Continued)

*Primary Examiner* — Audrey K Bradley
*Assistant Examiner* — Dapinder Singh
(74) *Attorney, Agent, or Firm* — Oliff PLC (57) ABSTRACT

A cooling system for an engine system includes an engine coolant path inside an internal combustion engine and a turbine coolant path inside a turbocharger. A switching section is selectively switched to one of a first operation mode, in which coolant in the cooling system is permitted to flow through the engine coolant path and the turbine coolant path, and a second operation mode, in which the coolant in the cooling system is permitted to flow only through the engine coolant path, while not being permitted to flow through the turbine coolant path. When the switching section is in the first operation mode and a basic flow rate calculated based on an engine operating state is larger than an actual flow rate detected by a flow rate sensor by at least a determination amount, the switching section is switched to the second operation mode.

5 Claims, 7 Drawing Sheets

(51) Int. Cl.
*F02B 37/00* (2006.01)
*F02B 39/00* (2006.01)
*F01P 3/20* (2006.01)
*F01P 7/16* (2006.01)
*F01P 5/10* (2006.01)
*F02B 39/16* (2006.01)

(56) References Cited

U.S. PATENT DOCUMENTS

2009/0044789 A1\* 2/2009 Eitel .................. F02M 25/0709
123/568.12

2011/0302920 A1\* 12/2011 Cuniberti .............. F01D 25/125
60/605.3
2012/0297765 A1\* 11/2012 Vigild ...................... F01P 3/20
60/599

FOREIGN PATENT DOCUMENTS

| | | |
|---|---|---|
| JP | 2008-019711 A | 1/2008 |
| JP | 2008-267257 A | 11/2008 |
| JP | 2009-047138 A | 3/2009 |
| JP | 2010-048187 A | 3/2010 |
| JP | 2011-220154 A | 11/2011 |
| JP | 2013-002307 A | 1/2013 |

\* cited by examiner

COOLING APPARATUS FOR ENGINE SYSTEM AND CONTROL METHOD THEREFOR

TECHNICAL FIELD

The present invention relates to a cooling apparatus for an engine system that cools an internal combustion engine and an exhaust turbine in a turbocharger, and to a controlling method for the cooling apparatus.

BACKGROUND ART

Conventionally, an engine system including an internal combustion engine as a main component is frequently provided with a turbocharger with an exhaust turbine. Furthermore, a cooling system has been proposed to be provided in such an engine system to cool not only the internal combustion engine but also the exhaust turbine (specifically, a turbine housing for the exhaust turbine) (see Patent Document 1). The apparatus described in Patent Document 1 is configured such that coolant flows from an engine coolant path inside the internal combustion engine into a turbine coolant path inside the turbine housing. Cooling with the coolant keeps the temperature of the turbine housing at an appropriate value.

PRIOR ART DOCUMENTS

Patent Documents

Patent Document 1: Japanese Laid-Open Patent Publication No. 2008-267257

SUMMARY OF THE INVENTION

Problems that the Invention is to Solve

In an engine system with a turbocharger, the turbine housing may be cracked due to the adverse effect of thermal stress resulting from operation of the system. In this case, not only may cooling performance be degraded by leakage of coolant from the crack to the outside of a turbine coolant path but also the leaked coolant from the crack may degrade an exhaust purification apparatus prematurely if the coolant flows into an exhaust passage of the internal combustion engine.

An objective of the present invention is to provide a cooling apparatus for an engine system that is capable of suppressing leakage of coolant from the turbine coolant path inside the turbine housing and a controlling method for the cooling apparatus.

Means for Solving the Problems

To achieve the foregoing objective and in accordance with one aspect of the present invention, a cooling apparatus for an engine system is provided that includes an internal combustion engine and a turbocharger. The cooling apparatus includes a cooling system, a switching section, a supply amount estimation section, an outflow amount sensor, and a control section. The cooling system through, which coolant circulates, includes an engine coolant path formed inside the internal combustion engine and a turbine coolant path formed inside a housing of an exhaust turbine in the turbocharger. The switching section is selectively switched to one of a first operation mode, in which coolant in the cooling system is permitted to flow through the engine coolant path and the turbine coolant path, and a second operation mode, in which the coolant in the cooling system is permitted to flow only through the engine coolant path, while not being permitted to flow through the turbine coolant path. The supply amount estimation section estimates an amount of coolant supplied to the turbine coolant path based on an operating state of the internal combustion engine. The outflow amount sensor detects an amount of coolant flowing out from the turbine coolant path. The control section switches the switching section to the second operation mode when the operation mode of the switching section is the first operation mode and the amount of coolant estimated by the supply amount estimation section is larger than the amount of coolant detected by the outflow amount sensor by at least a preset determination amount.

In the above-described apparatus, the flow state of coolant in the cooling system can be determined based on the operating state of the internal combustion engine by assuming that no coolant leaks from the cooling system when the operation mode of the switching section is the first operation mode. Thus, the amount of coolant supplied to the turbine coolant path (basic flow rate) can also be accurately estimated based on the operating state of the internal combustion engine. When an abnormality (turbine leakage abnormality) occurs in which coolant leaks from the inside to outside of the turbine coolant path, the amount of coolant flowing out from the turbine coolant path decreases by an amount corresponding to the leaking coolant. Thus, the amount of coolant leaking from the turbine coolant path (leakage amount) can be determined by detecting the amount of coolant actually flowing out from the turbine coolant path (actual flow rate) using the outflow amount sensor and subtracting the actual flow rate from the basic flow rate.

In the above-described apparatus, whether the turbine leakage abnormality is occurring can be determined based on the above-described leakage amount. Furthermore, when the occurrence of the turbine leakage abnormality is determined, the switching section is switched to the second operation mode to enable cutoff of the flow of coolant to the turbine coolant path and the circulation of coolant through the engine coolant path. This suppresses of leakage of coolant from the turbine coolant path inside the turbine housing.

The actual flow rate decreases not only when the turbine leakage abnormality occurs but also when an abnormality occurs in which the coolant leaks from the inside to outside of the engine coolant path (engine leakage abnormality). Thus, to accurately determine whether the turbine leakage abnormality is occurring, whether the turbine leakage abnormality is occurring is desirably determined based on the basic flow rate and the actual flow rate after absence of the engine leakage abnormality is confirmed.

The above described cooling apparatus may include a detection section that detects that an abnormality is not occurring in which coolant leaks from the engine coolant path. This allows the control section to switch to the second operation mode on condition that the detection section detects that the abnormality is not occurring.

In the above-described cooling apparatus, whether the turbine leakage abnormality is occurring can be accurately determined based on the basic flow rate and the actual flow rate after absence of the engine leakage abnormality is confirmed.

The above described cooling apparatus may include a temperature sensor that detects a temperature of coolant flowing out from the engine coolant path. In this case, the detection section detects that the abnormality is not occurring when an increase rate of the temperature detected by the temperature sensor is kept equal to or lower than a determination rate.

Also, when the increase rate exceeds the determination rate, the detection section detects that the abnormality is subsequently occurring.

In the above-described apparatus, even if the turbine leakage abnormality is occurring, the temperature of the internal combustion engine is maintained within an appropriate range and does not increase to an unwanted level as long as no coolant leaks from the engine coolant path and a sufficient flow rate of the coolant is ensured. On the other hand, when the engine leakage abnormality occurs, the amount of coolant flowing inside the engine coolant path decreases, thus making the temperature of the internal combustion engine likely to rise. The increase rate of the temperature of the internal combustion engine (the amount of increase per unit time) correspondingly increases. In this case, also for the temperature of coolant flowing out from the engine coolant path, which is an index value for an engine temperature, the increase rate increases.

In the above-described apparatus, when the increase rate of the coolant temperature detected by the temperature sensor is kept equal to or lower than the determination rate, this indicates that the temperature of the internal combustion engine has not increased rapidly, and thus, absence of the engine leakage abnormality can be determined. On the other hand, when the increase rate of the coolant temperature detected by the temperature sensor exceeds the determination rate, this indicates that the temperature of the internal combustion engine has increased rapidly, and thus, subsequent occurrence of the engine leakage abnormality can be determined.

To achieve the foregoing objective, a controlling method is provided for controlling a cooling apparatus for an engine system including an internal combustion engine and a turbocharger. The cooling apparatus includes a cooling system and a switching section. The cooling system, through which coolant circulates, includes an engine coolant path formed inside the internal combustion engine and a turbine coolant path formed inside a housing of an exhaust turbine in the turbocharger. The switching section is selectively switched to one of a first operation mode, in which coolant in the cooling system is permitted to flow through the engine coolant path and the turbine coolant path, and a second operation mode, in which the coolant in the cooling system is permitted to flow only through the engine coolant path, while not being permitted to flow through the turbine coolant path. The controlling method includes: estimating an amount of coolant supplied to the turbine coolant path based on an operating state of the internal combustion engine; detecting an amount of coolant flowing out from the turbine coolant path; and switching the switching section to the second operation mode when the operation mode of the switching section is the first operation mode and the amount of coolant supplied to the turbine coolant path is larger than the amount of coolant flowing out from the turbine coolant path by at least a preset determination amount.

The above described method may include detecting that an abnormality is not occurring in which coolant leaks from the engine coolant path. A condition for switching the switching section to the second operation mode includes detection absence of the abnormality.

MODES FOR CARRYING OUT THE INVENTION

First Embodiment

A cooling apparatus for an engine system according to a first embodiment of the present invention will now be described.

Figure 1:
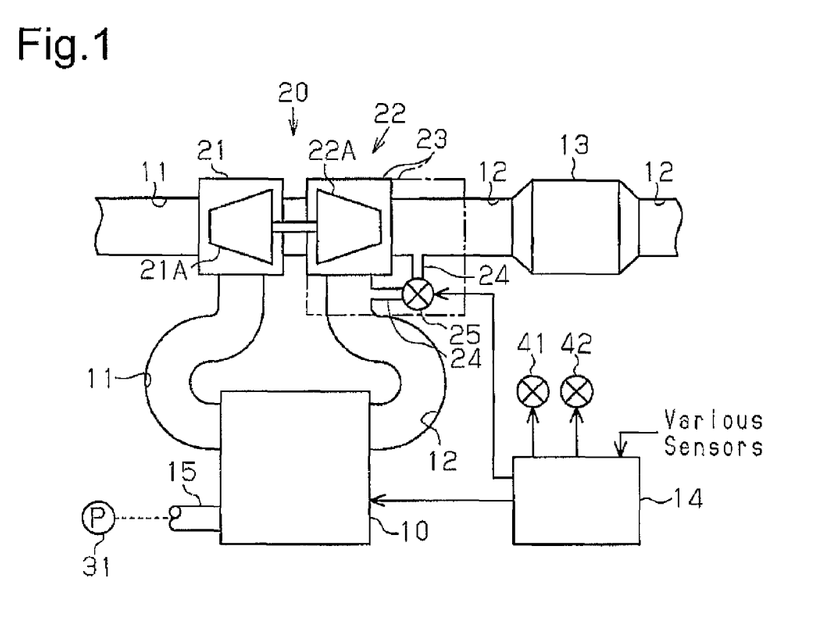
FIG. 1 is a schematic diagram depicting a general configuration of a cooling apparatus for an engine system according to a first embodiment.

As depicted in FIG. 1, an engine system according to the present embodiment includes an internal combustion engine 10 as a main component. The internal combustion engine 10 is provided with a turbocharger 20 that pressurizes and delivers intake air in an intake passage 11 to supercharge the engine 10. Specifically, a compressor 21 in a turbocharger 20 is attached to the intake passage 11 to the internal combustion engine 10. An exhaust turbine 22 in the turbocharger 20 is attached to an exhaust passage 12 to the internal combustion engine 10. The turbocharger 20 is an exhaust driven type, in which a compressor wheel 21A provided inside the compressor 21 is coupled to a turbine wheel 22A provided inside the exhaust turbine 22. An exhaust purification apparatus 13 configured to purify exhaust is attached to the exhaust passage 12 on the downstream side of the exhaust turbine 22 in an exhaust flow direction.

A turbine housing 23 of the exhaust turbine 22 is provided with a communication path 24 through which the upstream side in the exhaust flow direction of the turbine wheel 22A in the exhaust passage 12 communicates with the downstream side of the turbine wheel 22A in the exhaust flow direction. Furthermore, a wastegate valve 25 is attached to the turbine housing 23 to switch between a state where a flow of exhaust through the communication path 24 is permitted and a state where the flow of exhaust is cut off. Opening the wastegate valve 25 allows some of the exhaust to flow to the downstream side of the turbine wheel 22A through the communication path 24 to bypass the turbine wheel 22A.

Figure 2:
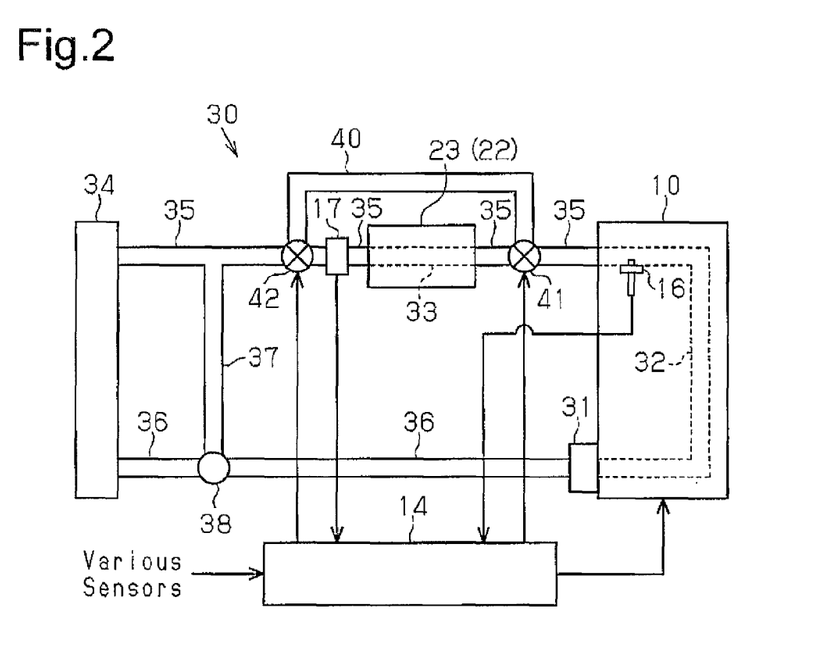
FIG. 2 is a schematic diagram depicting a general configuration of a cooling system in the first embodiment.

As depicted in FIG. 2, the engine system according to the present embodiment is provided with a cooling system 30 configured to cool the internal combustion engine 10 and the turbine housing 23 of the turbocharger 20. The cooling system 30 is provided with a water pump 31 that is driven via a crankshaft 15 (see FIG. 1) of the internal combustion engine 10. When the water pump 31 is activated in conjunction with operation of the internal combustion engine 10, coolant stored inside the cooling system 30 is forcibly circulated.

An engine coolant path 32 is formed inside the internal combustion engine 10, and a turbine coolant path 33 is formed inside the turbine housing 23. In the cooling system 30, coolant passes through the engine coolant path 32 and the turbine coolant path 33. Paths in the cooling system 30 through which coolant circulates include, besides the engine coolant path 32 and the turbine coolant path 33, a radiator 34, coolant passages 35 and 36, and a bypass water path 37.

The radiator 34 is a heat exchanger configured to cool coolant passing through the radiator 34, through heat exchange with outside air. The coolant passage 35 is a passage configured to guide coolant flowing out from the engine coolant path 32, to the radiator 34. The turbine coolant path 33 is attached to the middle of the coolant passage 35. The coolant passage 36 is a passage configured to return coolant having passed through the radiator 34, to the engine coolant path 32. The bypass water path 37 is a passage through which a downstream side, in a coolant flow direction, of the turbine coolant path 33 in the coolant passage 35 communicates with the coolant passage 36 to bypass the radiator 34.

A thermostat valve 38 is provided in a junction portion between the bypass water path 37 and the coolant passage 36. The thermostat valve 38 is configured to have an opening degree varying in accordance with the temperature of coolant contacting the thermostat valve 38. A change in the opening degree of the thermostat valve 38 changes the passage cross sectional areas of the coolant passage 36 and the bypass water path 37. This allows adjustment of the amount of coolant flowing into the radiator 34.

A bypass passage 40 extending while bypassing the turbine coolant path 33 is attached to the coolant passage 35. Furthermore, a first switching valve 41 is provided at a position where the bypass passage 40 branches from the coolant passage 35. A second switching valve 42 is provided at a position where the bypass passage 40 joins the coolant passage 35. The first switching valve 41 and the second switching valve 42 function as a switching section. The operating state of the switching section can be selectively switched between a first operation mode and a second operation mode described below.

First operation mode: the flow of coolant into the bypass passage 40 is inhibited, whereas the flow of coolant into the turbine coolant path 33 is permitted. That is, in the first operation mode, the engine coolant path 32 serves as the upstream side in the coolant flow direction, whereas the turbine coolant path 33 serves as the downstream side in the coolant flow direction, and the engine coolant path 32 and the turbine coolant path 33 are connected together in series to permit coolant in the cooling system 30 to flow in series from the engine coolant path 32 to the turbine coolant path 33.

Second operation mode: the flow of coolant into the turbine coolant path 33 is inhibited, whereas the flow of coolant into the bypass passage 40 is permitted. That is, coolant in the cooling system 30 is permitted to flow only through the engine coolant path 32, while not permitted to flow through the turbine coolant path 33.

The apparatus according to the present embodiment includes, for example, an electronic control apparatus 14 including a micro-computer. The electronic control apparatus 14 receives, from various sensors, detection signals that allow the operating state of the internal combustion engine 10 to be detected.

The various sensors include a crank sensor configured to detect the rotation speed of the crankshaft 15 (engine speed NE) and an intake amount sensor configured to detect the amount of intake air (intake air amount GA) passing through the intake passage 11. Furthermore, the sensors include a temperature sensor 16 configured to detect the temperature (THW) of coolant flowing out from the engine coolant path 32 and a flow rate sensor 17 configured to detect the amount (actual flow rate VW) of coolant flowing out from the turbine coolant path 33. The temperature sensor 16 is attached to the vicinity of a connection portion of the engine coolant path 32 of the internal combustion engine 10 connected to the coolant passage 35. Additionally, the flow rate sensor 17 is attached to the coolant passage 35 between the exhaust turbine 22 and the second switching valve 42. In the present embodiment, the flow rate sensor 17 corresponds to an outflow amount sensor.

The electronic control apparatus 14 executes various calculations based on the detection signals from the various sensors to perform, based on the results of the calculations, various control operations such as fuel injection control, operation control for the wastegate valve 25, and operation control for the first switching valve 41 and the second switching valve 42. In the present embodiment, the electronic control apparatus 14 functions as a detection section, a supply amount estimation section, and a control section.

In the above-described engine system, the turbine housing 23 may be cracked due to the adverse effect of thermal stress resulting from operation of the internal combustion engine 10. In this case, not only may cooling performance be degraded by leakage of coolant from the crack to the outside of the turbine coolant path 33 but also the coolant may bring about the following disadvantages if the coolant flows into the exhaust passage 12 to the internal combustion engine 10. Coolant in the exhaust passage 12 evaporates to rapidly raise the exhaust pressure, resulting in a risk of reducing the amount of intake air and thus the output torque from the internal combustion engine 10. Furthermore, moisture resulting from evaporation in the exhaust passage 12 passes through the exhaust purification apparatus 13 and may cause premature degradation of the exhaust purification apparatus 13, such as corrosion or cracking of the exhaust purification apparatus 13.

Figure 3:
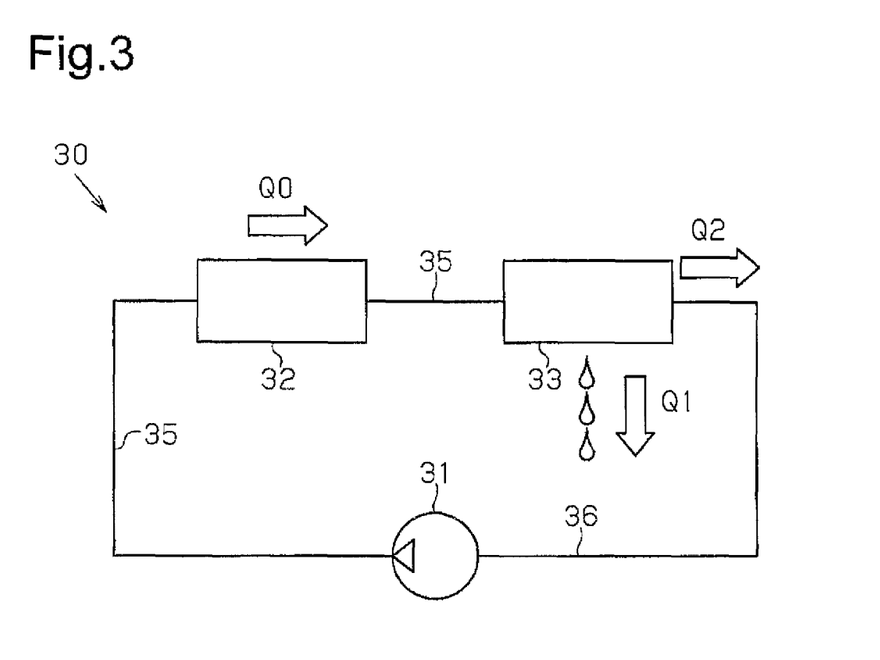
FIG. 3 is a conceptual drawing conceptually depicting the flow rate of coolant in each section of the cooling system.

FIG. 3 conceptually depicts the flow rate of coolant in each section of the cooling system 30.

Given that no coolant is leaking from the cooling system 30 while the switching valves 41 and 42 are in the first operation mode, the amount of coolant supplied to the turbine coolant path 33 (basic flow rate [$Q0$ in FIG. 3]) is approximately equal to the amount of coolant passing through the engine coolant path 32, and approximately equal to the amount of coolant pressurized and delivered by the water pump 31. The amount of coolant pressurized and delivered by the water pump 31 can be accurately estimated based on the operating state of the internal combustion engine 10 (for example, an engine load KL, an engine speed NE, and a coolant temperature THW). Thus, the basic flow rate $Q0$ can be accurately estimated based on the operating state of the internal combustion engine 10.

Furthermore, when an abnormality (turbine leakage abnormality) occurs in which coolant leaks from the inside to outside of the turbine coolant path 33, a decrease occurs in the amount of coolant flowing out to the coolant passage 35 after passing through the turbine coolant path 33. Thus, the amount of coolant leaking from the inside to outside of the turbine coolant path 33 (leakage amount [$Q1$ ($Q1=Q0-Q2$) in FIG. 3]) can be determined by detecting the amount of coolant actually flowing out from the turbine coolant path 33 to the coolant passage 35 (actual flow rate [$Q2$ in FIG. 3]) using the flow rate sensor 17 and subtracting the actual flow rate $Q2$ from the basic flow rate Q0. Then, whether the turbine leakage abnormality is occurring can be determined based on the leakage amount Q1.

However, the actual flow rate Q2 decreases not only when the turbine leakage abnormality occurs but also when an abnormality occurs in which the coolant leaks from the inside to outside of the engine coolant path 32 (engine leakage abnormality). Thus, to accurately determine whether the turbine leakage abnormality is occurring, it is preferable to determine whether the turbine leakage abnormality is occurring based on the basic flow rate Q0 and the actual flow rate Q2 after absence of the engine leakage abnormality is confirmed.

Accordingly, in the present embodiment, absence of the engine leakage abnormality is detected when whether the turbine leakage abnormality is occurring is determined based on the basic flow rate Q0 and the actual flow rate Q2. Thus, occurrence of the turbine leakage abnormality can be determined based on the basic flow rate Q0 and the actual flow rate Q2 after confirmation of absence of the engine leakage abnormality. Therefore, occurrence of the turbine leakage abnormality can be accurately determined.

In this regard, the engine coolant path 32 is provided on the upstream side of the turbine coolant path 33 in the coolant flow direction. Thus, even if the turbine leakage abnormality is occurring, the temperature of the internal combustion engine 10 is maintained within an appropriate range and does not increase to an unwanted temperature as long as the engine leakage abnormality is not occurring and a sufficient flow rate of coolant passing through the engine coolant path 32 is ensured. Thus, when the temperature of the internal combustion engine 10 is kept low, it is possible to determine that the engine leakage abnormality is not occurring and that the internal combustion engine 10 is appropriately cooled.

On the other hand, when the engine leakage abnormality occurs, the amount of coolant flowing through the engine coolant path 32 decreases, thus making the temperature of the internal combustion engine 10 likely to rise. The increase rate of the temperature of the internal combustion engine 10 (the amount of increase per unit time) correspondingly increases. In this case, also for the temperature of coolant flowing out from the engine coolant path 32 to the coolant passage 35, which is an index value for the temperature of the internal combustion engine 10, the increase rate increases.

Based on this, in the present embodiment, absence of the engine leakage abnormality is detected when the increase rate of the coolant temperature THW detected by the temperature sensor 16 is kept equal to or lower than the determination rate. On the other hand, when the increase rate of the coolant temperature THW exceeds the determination rate, subsequent occurrence of the engine leakage abnormality is detected. According to the present embodiment, when the increase rate of the coolant temperature THW is kept equal to or lower than the determination rate, this indicates that the temperature of the internal combustion engine 10 has not increased rapidly, and thus, absence of the engine leakage abnormality can be determined. Moreover, when the increase rate of the coolant temperature THW exceeds the determination rate, this indicates that the temperature of the internal combustion engine 10 has increased rapidly, and thus, occurrence of the engine leakage abnormality can be determined. For the apparatus according to the present embodiment, the increase rate of the coolant temperature THW at the time of occurrence of the engine leakage abnormality is determined in advance based on the results of various experiments and simulations. Based on the increase rate, the determination rate is set to enable adequate detection of a rapid rise in the temperature of the internal combustion engine 10 resulting from the occurrence of the engine leakage abnormality. The determination rate is stored in the electronic control apparatus 14.

In the present embodiment, when absence of the engine leakage abnormality is detected, the first switching valve 41 and the second switching valve 42 are operated in accordance with the leakage amount Q1 (Q1=basic flow rate Q0−actual flow rate Q2). Specifically, when the leakage amount Q1 is smaller than a determination amount, occurrence of the turbine leakage abnormality is not detected, and the switching valves 41 and 42 are maintained in the first operation mode. At this time, coolant circulates through the engine coolant path 32 and the turbine coolant path 33 to cool both the internal combustion engine 10 and the turbine housing 23. In the present embodiment, the difference between the basic flow rate Q0 and the actual flow rate Q2 at the time of occurrence of the turbine leakage abnormality is determined in advance based on the results of experiments and simulations. Based on the difference, the determination amount is set to enable an early and accurate determination of occurrence of the turbine leakage abnormality. The determination amount is stored in the electronic control apparatus 14.

On the other hand, when the leakage amount Q1 is equal to or larger than the determination amount, the turbine leakage abnormality may be occurring, and thus, the switching valves 41 and 42 are switched to the second operation mode. At this time, the flow of coolant into the turbine coolant path 33 is cut off to allow the coolant to flow into and circulate through only the engine coolant path 32. This allows maintenance of the function to cool the internal combustion engine 10 and simultaneous suppression of leakage of coolant from the inside to outside of the turbine coolant path 33. It is also possible to suppress a possible shortage of coolant in the engine coolant path 32 and a possible marked decrease in intake air amount GA caused by evaporation of coolant in the exhaust passage 12. Thus, operating functions of the internal combustion engine 10 are maintained. Consequently, when the engine system is mounted in a vehicle as a driving source, the vehicle can be allowed to perform limp-home mode and driven to a repair shop.

Execution procedures will be described below in detail which are intended for a process of determining whether an abnormality is occurring in the cooling system 30 (abnormality determination process) and a process of switching the operation mode of the switching valves 41 and 42 in accordance with the result of the determination (switching process), respectively.

Figure 4:
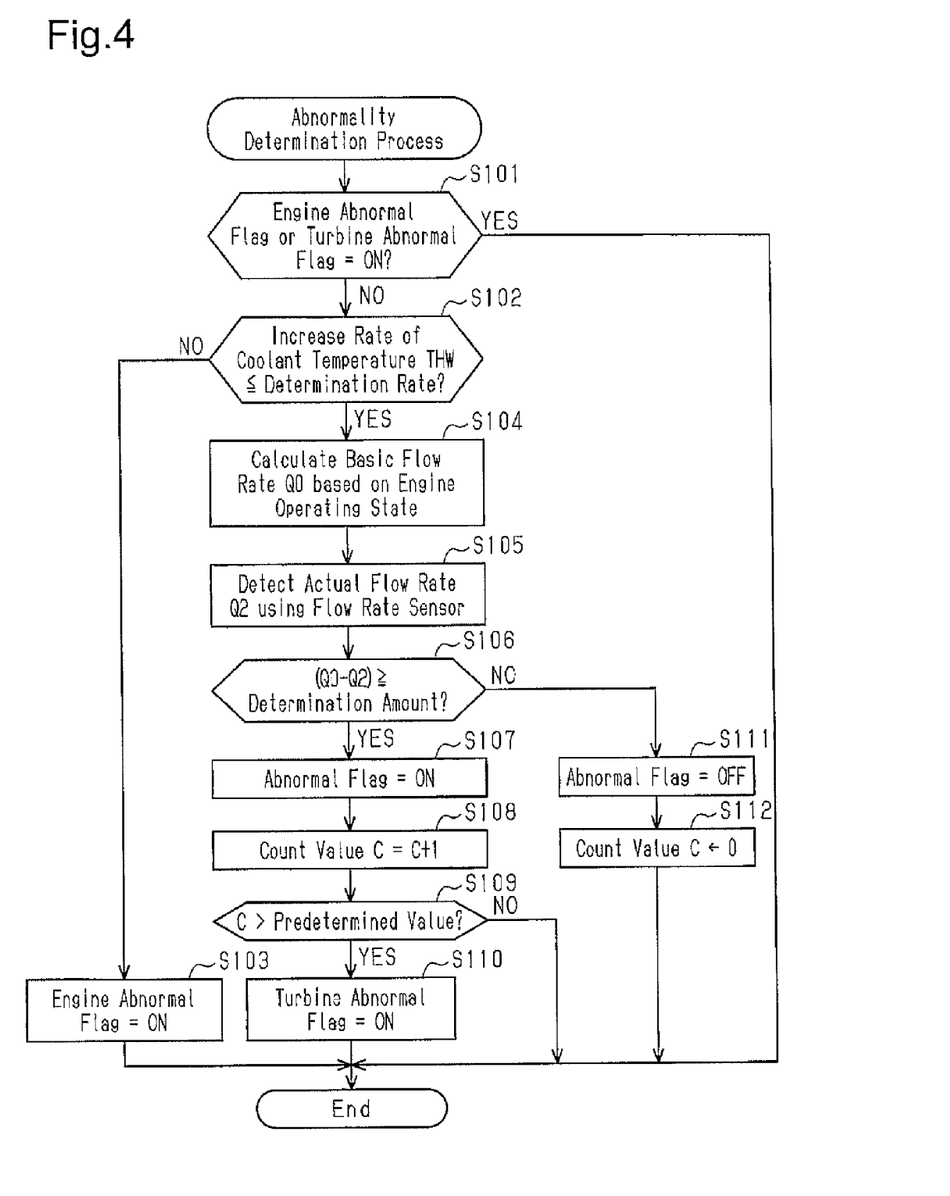
FIG. 4 is a flowchart depicting an execution procedure for an abnormality determination process.

First, the execution procedure for the abnormality determination process will be described with reference to FIG. 4. FIG. 4 is a flowchart depicting the execution procedure for the abnormality determination process. A series of processes depicted in the flowchart is executed by the electronic control apparatus 14 at predetermined intervals as an interruption process.

As depicted in FIG. 4, on condition that both an engine abnormal flag and a turbine abnormal flag have been turned off (step S101: NO), the process first determines whether the increase rate of the coolant temperature THW is equal to or lower than the determination rate (step S102).

Then, when the increase rate of the coolant temperature THW is higher than the determination rate (step S102: NO), leakage of coolant from the engine coolant path 32 is likely to be occurring, and thus, the engine abnormal flag is turned on (step S103). Then, the process is temporarily ended. The engine abnormal flag is thus turned on, and subsequently (step S101: YES), processing in steps S102 to S112 is not executed. Then, operation control of the internal combustion engine 10 is performed which is appropriate for the time of occurrence of the engine leakage abnormality.

On the other hand, when the increase rate of the coolant temperature THW is equal to or lower than the determination rate (step S102: YES), the engine leakage abnormality is likely not to be occurring, and thus, the basic flow rate Q0 is calculated based on the operating state (the engine load KL, the engine speed NE, and the coolant temperature THW) of the internal combustion engine 10 (step S104). Furthermore, the flow rate sensor 17 detects the actual flow rate Q2 (step S105). In the present embodiment, the relation between the basic flow rate Q0 and the engine operating state determined by the engine load KL, the engine speed NE, and the coolant temperature THW is determined in advance based on the results of various experiments and simulations, and stored in the electronic control apparatus 14. In the processing in step S104, the basic flow rate Q0 is calculated based on the relation. In the present embodiment, a value (GA/NE) resulting from division of the intake air amount GA by the engine speed NE is used as the engine load KL. The intake air amount GA, a fuel injection amount, or the like may be used as the engine load KL.

Then, whether the amount (the leakage amount Q1) resulting from subtraction of the actual flow rate Q2 from the basic flow rate Q0 is determined (step S106). When the leakage amount Q1 is equal to or larger than the determination amount (step S106: YES), the turbine leakage abnormality is likely to be occurring, and thus, the abnormal flag is turned on (step S107). Furthermore, a count value C is incremented (step S108). Subsequently, increment of the count value C is executed (step S108) each time a determination is made that the increase rate of the coolant temperature THW is equal to or lower than the determination rate (step S102: YES) and each time a determination is made that the leakage amount Q1 is equal to or larger than a predetermined amount (step S106: YES). The count value C has an initial value of 0 and depends on the period of time when the increase rate of the coolant temperature THW is equal to or lower than the determination rate and the leakage amount Q1 is equal to or larger than a predetermined amount.

Then, when the process is repeatedly executed to increase the count value C above a predetermined value (step S109: YES), the engine leakage abnormality is very likely not to be occurring, and the result of the determination that the turbine leakage abnormality is occurring which has been made in the processing in steps S104 to S107 is very reliable. Thus, the turbine abnormal flag is turned on (step S110). Subsequently, the process is temporarily ended. Concurrently with the turn-on of the turbine abnormal flag, occurrence of an abnormality may be reported by turning on a warning light or displaying the occurrence of the abnormality on an image display apparatus, or a history of occurrence of the turbine leakage abnormality may be stored in the electronic control apparatus 14.

On the other hand, when the increase rate of the coolant temperature THW becomes higher than the determination rate (step S102: NO) before the count value C increases above the predetermined value (step S109: NO), the engine leakage abnormality is very likely to be occurring, and an increase in leakage amount Q1 is likely to be caused by the engine leakage abnormality. Thus, the engine abnormal flag is turned on (step S103). Subsequently, the process is temporarily ended. In this case, operation control of the internal combustion engine 10 is performed that is appropriate for the time of occurrence of the engine leakage abnormality.

On the other hand, when the leakage amount Q1 becomes smaller than the determination amount (step S106: NO) before the count value C increases above the predetermined value (step S109: NO), the turbine leakage abnormality is unlikely to be occurring, and thus, the abnormal flag is turned off (step S111). The count value C is reset to 0 (step S112). Subsequently, the process is temporarily ended.

Then, when the engine leakage abnormality occurs, the coolant flow rate in the engine coolant path 32 decreases to degrade the function to cool the internal combustion engine 10. This leads to a rise in the temperature of the internal combustion engine 10 and thus coolant temperature THW rises. As a result, evidently, a slight delay occurs after occurrence of the engine leakage abnormality and before a rise in coolant temperature THW.

Consequently, if the abnormality determination process is executed while the coolant temperature THW is not rising in spite of occurrence of the engine leakage abnormality, the accuracy of determination of whether the turbine leakage abnormality is occurring decreases. That is, when absence of the turbine leakage abnormality is determined because the increase rate of the coolant temperature THW is kept equal to or lower than the determination rate (step S102: YES) and a determination of whether the turbine leakage abnormality is occurring is simply performed (steps S104 to S106), the leakage amount Q1 is expected to have increased due to occurrence of the turbine leakage abnormality even though the leakage amount Q1 has increased due to occurrence of the engine leakage abnormality. Thus, occurrence of the turbine leakage abnormality may be erroneously determined.

When absence of the turbine leakage abnormality is determined on condition that the increase rate of the coolant temperature THW remains low over a given period of time in order to allow an accurate determination of whether the turbine leakage abnormality is occurring, a timing when occurrence of the turbine leakage abnormality is detected is delayed. This is not preferable.

In this regard, in the present embodiment, when the increase rate of the coolant temperature THW is equal to or lower than the determination rate (step S102: YES), whether the turbine leakage abnormality is occurring is determined (steps S104 to S106). When occurrence of the turbine leakage abnormality is determined (step S106: YES), the switching valves 41 and 42 are switched to the second operation mode. Then, when the increase rate of the coolant temperature THW is kept low for a subsequent predetermined period (step S109: YES), absence of the engine leakage abnormality is confirmed to allow determination of occurrence of the turbine leakage abnormality (step S110). Execution of such processing allows expeditious dealing with the turbine leakage abnormality and an appropriate determination of whether the turbine leakage abnormality is occurring.

As the above-described predetermined period (the period from the time when the count value is 0 until the count value becomes larger than a predetermined value), a sufficiently long period is preset that enables adequate suppression of an erroneous determination of occurrence of the turbine leakage abnormality, which results from a difference between the timing of occurrence of the engine leakage abnormality and the timing of a rapid rise in the temperature of the internal combustion engine 10. The preset period is stored in the electronic control apparatus 14.

Figure 5:
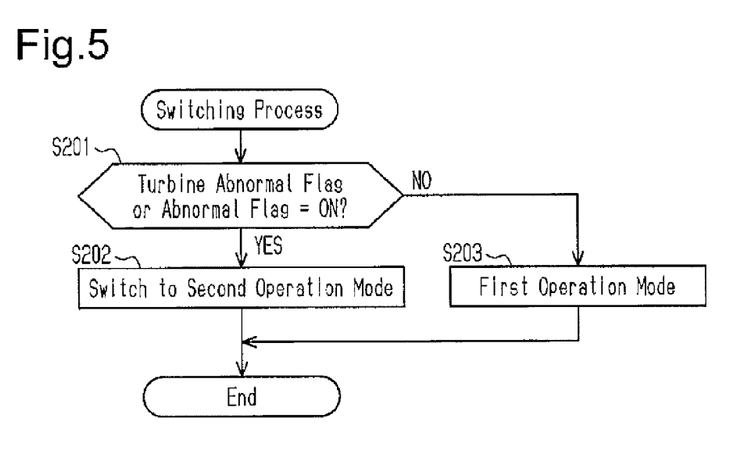
FIG. 5 is a flowchart depicting an execution procedure for a switching process.

Now, the execution procedure for the switching process will be described with reference to FIG. 5. FIG. 5 is a flowchart depicting the execution procedure for the switching process. A series of processes depicted in the flowchart is executed by the electronic control apparatus 14 at predetermined intervals as an interruption process.

As depicted in FIG. 5, in this process, when the abnormal flag or the turbine abnormal flag has been turned on (step S201: YES), the operation mode of the switching valves 41 and 42 is switched to the second operation mode (step S202). On the other hand, when both the abnormal flag and the turbine abnormal flag are turned off (step S201: NO), the operation mode of the switching valves 41 and 42 remains the first operation mode (step S203). After the operation mode of the switching valves 41 and 42 is controlled depending on the operating state of the abnormal flag or the turbine abnormal flag, the process is temporarily ended.

As described above, the present embodiment provides the following advantages.

(1) When the operation mode of the switching valves 41 and 42 is the first operation mode and the basic flow rate Q0 is more than the actual flow rate Q2 by at least the determination amount, the switching valves 41 and 42 are switched to the second operation mode. Thus, the flow of coolant into the turbine coolant path 33 is cut off to allow the coolant to flow into and circulate through only the engine coolant path 32. This allows maintenance of the function to cool the internal combustion engine 10 and simultaneous suppression of leakage of coolant from the inside to outside of the turbine coolant path 33.

(2) Switching of the switching valves 41 and 42 to the second operation mode is performed when absence of the engine leakage abnormality is detected. This enables occurrence of the turbine leakage abnormality to be determined based on the basic flow rate Q0 and the actual flow rate Q2 after absence of the engine leakage abnormality is confirmed. Thus, whether the turbine leakage abnormality is occurring can be accurately determined.

(3) When the increase rate of the coolant temperature THW is kept equal to or lower than the determination rate, absence of the engine leakage abnormality is detected. On the other hand, when the increase rate of the coolant temperature THW exceeds the determination rate, subsequent occurrence of the engine leakage abnormality is detected. Thus, when the increase rate of the coolant temperature THW is kept equal to or lower than the determination rate, this indicates that the temperature of the internal combustion engine 10 has not increased rapidly, and thus, absence of the engine leakage abnormality can be determined. Moreover, when the increase rate of the coolant temperature THW exceeds the determination rate, this indicates that the temperature of the internal combustion engine 10 has increased rapidly, and thus, occurrence of the engine leakage abnormality can be determined.

Second Embodiment

A cooling apparatus for an engine system according to a second embodiment will now be described. The differences from the first embodiment will mainly be discussed.

Figure 6:
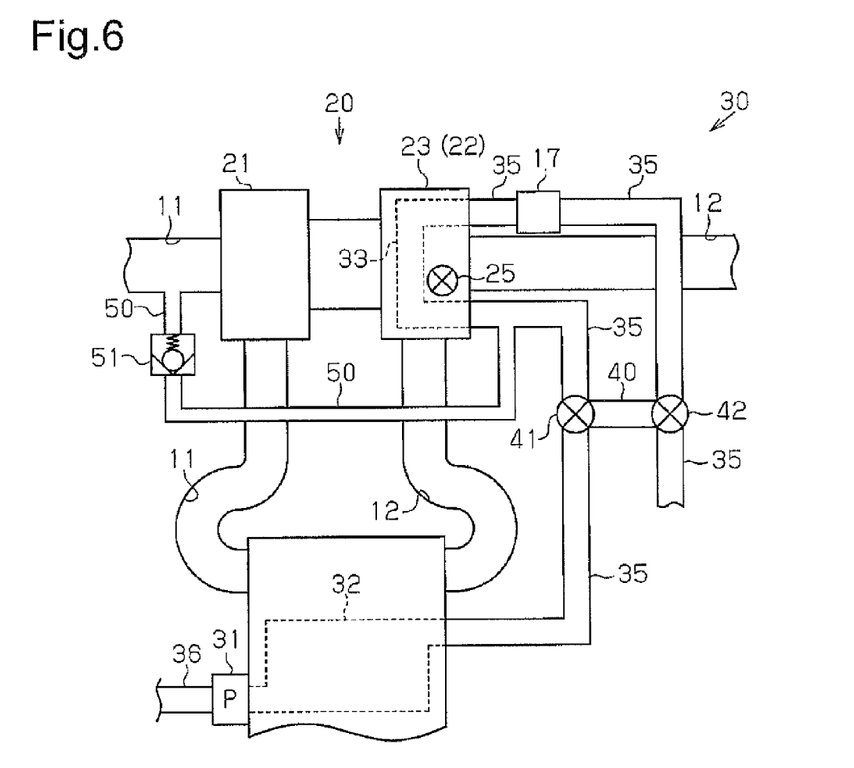
FIG. 6 is a schematic diagram depicting a general configuration of a cooling apparatus for an engine system according to a second embodiment.

FIG. 6 depicts a general configuration of the cooling apparatus for an engine system according to the present embodiment. The same components in FIG. 6 as the corresponding components of the cooling apparatus according to the first embodiment depicted in FIG. 1 are denoted by the same reference numerals and will not be described in detail.

As depicted in FIG. 6, the engine system according to the present embodiment includes a passage 50 that allows a part of the coolant passage 35 positioned between the first switching valve 41 and the turbine coolant path 33 to communicate with a part of the intake passage 11 positioned on the upstream side of the compressor 21 in an intake flow direction. A differential pressure regulating valve 51 is attached to the middle of the passage 50. The differential pressure regulating valve 51 is configured to be opened when the pressure P1 of a first portion of the passage 50 that is closer to the coolant passage 35 than the differential pressure regulating valve 51 is higher, by at least a predetermined pressure JPA, than the pressure P2 of a second portion of the passage 50, which is closer to the intake passage 11 than the differential pressure regulating valve 51 ([P1−P2]≥JPA). The differential pressure regulating valve 51 is not opened when the cooling system 30 is operating normally and the coolant temperature THW is adjusted to within an appropriate temperature range. On the other hand, the differential pressure regulating valve 51 is opened when the turbine leakage abnormality occurs to excessively increase the pressure in the turbine coolant path 33. The present embodiment adopts the differential pressure regulating valve 51 that meets such requirements.

Operation of the passage 50 and the differential pressure regulating valve 51 will be described below.

When the turbine leakage abnormality occurs to cause the switching valves 41 and 42 to switch to the second operation mode, the supply of coolant to the turbine coolant path 33 is stopped. Thus, the coolant in the turbine coolant path 33 is retained and continuously heated. In association with this, a rise in the coolant temperature, evaporation of coolant, and the like occur to increase the internal pressure of the turbine coolant path 33. Then, an increased amount of coolant may leak from the turbine coolant path 33 to the exhaust passage 12. In this case, a rise in exhaust pressure may drastically reduce the intake air amount GA to preclude the internal combustion engine 10 from being operated or a large amount of moisture may be supplied to the exhaust purification apparatus 13 to more markedly degrade the exhaust purification apparatus 13.

In the apparatus according to the present embodiment, when the turbine leakage abnormality occurs to increase the pressure in the turbine coolant path 33, the pressure of the first portion of the passage 50 increases to open the differential pressure regulating valve 51. Thus, the coolant in the turbine coolant path 33 evaporates, and the resultant vapor is discharged to the intake passage 11 via the passage 50. Such operation of the differential pressure regulating valve 51 enables suppression of a rise in the internal pressure of the turbine coolant path 33. This enables a reduction in the amount of coolant leaking from the turbine coolant path 33 to the exhaust passage 12, allowing inhibition of a decrease in the intake air amount GA of the internal combustion engine 10 and premature degradation of the exhaust purification apparatus 13.

Furthermore, in the apparatus according to the present embodiment, the passage 50 is connected to a part of the intake passage 11 positioned on the upstream side of the compressor 21 in the intake flow direction to allow the vapor of the coolant to be discharged into the intake passage 11 via the passage 50. Thus, the vapor of the coolant discharged into the intake passage 11 passes through the compressor 21.

Figure 7:
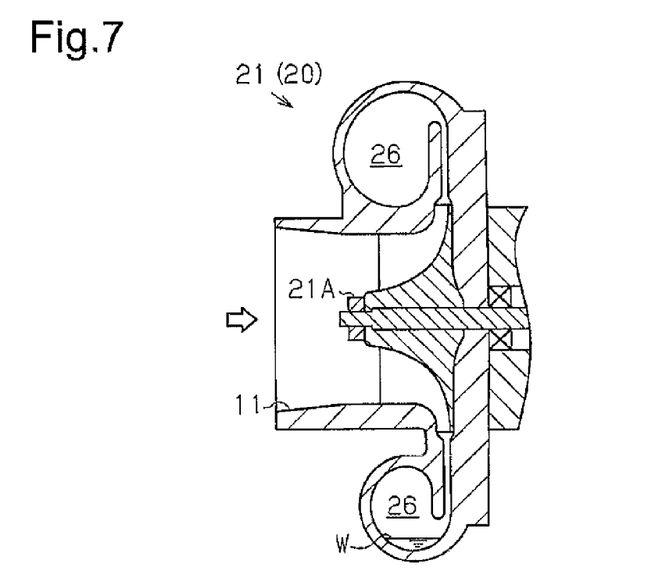
FIG. 7 is a cross-sectional view depicting a cross-sectional structure of a compressor.

As depicted in FIG. 7, the compressor 21 of the turbocharger 20 is configured such that the compressor wheel 21A rotates to pressurize and deliver intake air. The intake air passes through a scroll passage 26 extending around the compressor wheel 21A in a spiral manner. Consequently, when the intake air containing vapor of the coolant passes through the scroll passage 26, the scroll passage 26 functions as a centrifuge that separates the moisture contained in the intake air. Then, the moisture separated from the intake air inside the scroll passage 26 is collected in a vertically lower part of the scroll passage 26 (the part depicted by W in FIG. 7). Thus, in the apparatus according to the present embodiment, the compressor 21 functions as a centrifuge that separates moisture from intake air. Accordingly, although the vapor of coolant is discharged into the intake passage 11 in the internal combustion engine 10 at the time of occurrence of the turbine leakage abnormality, the moisture in the vapor can be restrained from being supplied to a combustion chamber in the internal combustion engine 10. This allows inhibition of accidental fire in the internal combustion engine 10 caused by the flow of moisture into the combustion chamber.

Moreover, in the apparatus according to the present embodiment, when the turbine leakage abnormality occurs to cause the abnormal flag or the turbine abnormal flag to be turned on, not only are the switching valves 41 and 42 switched to the second operation mode but also the wastegate valve 25 is driven to the maximum opening degree. Thus, at this time, although the exhaust pressure may rise rapidly as a result of evaporation of coolant having leaked from the turbine coolant path 33 into the exhaust passage 12, a rise in the pressure in the exhaust passage 12 is suppressed. Consequently, a decrease in intake air amount GA caused by a rise in exhaust pressure can be restrained, allowing a decrease in the output torque from the internal combustion engine 10 to be suppressed.

Third Embodiment

A cooling apparatus for an engine system according to a third embodiment will now be described. The differences from the first and second embodiments will mainly be discussed.

Figure 8:
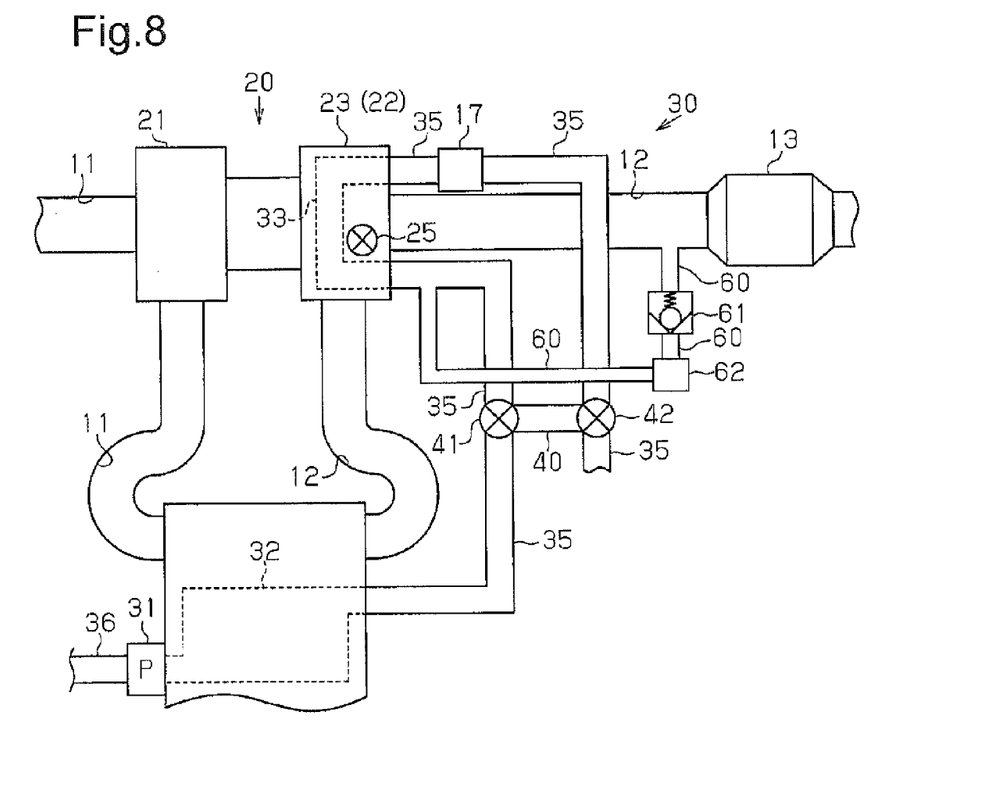
FIG. 8 is a schematic diagram depicting a general configuration of a cooling apparatus for an engine system according to a third embodiment.

FIG. 8 depicts a general configuration of the cooling apparatus for an engine system according to the present embodiment. The same components in FIG. 8 as the corresponding components of the cooling apparatus according to the first embodiment depicted in FIG. 1 or the cooling apparatus according to the second embodiment depicted in FIG. 6 are denoted by the same reference numerals and will not be described in detail.

As depicted in FIG. 8, the engine system according to the present embodiment includes a passage 60 that allows a part of the coolant passage 35 positioned between the first switching valve 41 and the turbine coolant path 33 to communicate with a part of the exhaust passage 12 positioned between the exhaust turbine 22 and the exhaust purification apparatus 13. A differential pressure regulating valve 61 is attached to the middle of the passage 60. The differential pressure regulating valve 61 is configured to be opened when the pressure P3 of a third portion of the passage 60 that is closer to the coolant passage 35 than the differential pressure regulating valve 61 is higher, by at least a predetermined pressure JPB, than the pressure P4 of a fourth portion of the passage 60 that is closer to the exhaust passage 12 than the differential pressure regulating valve 61 ([P3−P4]≥JPB). The differential pressure regulating valve 61 is not opened when the cooling system 30 is operating normally and the coolant temperature THW is adjusted to within an appropriate temperature range. On the other hand, the differential pressure regulating valve 61 is opened when the turbine leakage abnormality occurs to excessively increase the pressure in the turbine coolant path 33. The present embodiment adopts the differential pressure regulating valve 61 that meets such requirements.

Furthermore, in the passage 60, a separator 62 configured to separate moisture contained in gas passing though the passage 60 is attached to the third portion, which is closer to the coolant passage 35 than the differential pressure regulating valve 61.

Operation of the above-described passage 60 and differential pressure regulating valve 61 will be described below.

When the turbine leakage abnormality occurs to cause the switching valves 41 and 42 to switch to the second operation mode, the supply of coolant to the turbine coolant path 33 is stopped. Thus, the coolant in the turbine coolant path 33 is retained and continuously heated. This leads to a rise in the coolant temperature THW, evaporation of coolant, and the like occur to increase the internal pressure of the turbine coolant path 33. Then, an increased amount of coolant may leak from the turbine coolant path 33 to the exhaust passage 12. In this case, a rise in exhaust pressure may drastically reduce the intake air amount GA to preclude the internal combustion engine 10 from being operated or a large amount of moisture may be supplied to the exhaust purification apparatus 13 to crack the exhaust purification apparatus 13.

In the apparatus according to the present embodiment, when the turbine leakage abnormality occurs to increase the pressure in the turbine coolant path 33, the pressure of the third portion of the passage 60 increases to open the differential pressure regulating valve 61. Thus, the coolant in the turbine coolant path 33 evaporates, and the resultant vapor is discharged to the exhaust passage 12 via the passage 60 and the separator 62. Since the discharge of the vapor into the exhaust passage 12 is performed via the separator, the moisture may flow from the turbine coolant path 33 into the exhaust passage 12. However, the amount of inflow moisture can be reduced by an amount corresponding to the moisture separated by the separator 62, so that a decrease in the intake air amount GA of the internal combustion engine 10, occurrence of crack abnormality of the exhaust purification apparatus 13, and the like can be suppressed. Moreover, since the vapor is discharged to the exhaust passage 12 via the passage 60, a rise in the internal pressure of the turbine coolant path 33 can be restrained. Thus, if coolant leaks to the exhaust passage 12 via a crack formed in the turbine coolant path 33, the amount of leakage can be reduced.

Furthermore, in the apparatus according to the present embodiment, when the turbine leakage abnormality occurs to cause the abnormal flag or the turbine abnormal flag to be turned on, not only are the switching valves 41 and 42 switched to the second operation mode but also the wastegate valve 25 is driven to the maximum opening degree. Thus, at this time, although coolant may leak into the exhaust passage 12 via the crack formed in the turbine coolant path 33 and the exhaust pressure may rise rapidly as a result of evaporation of the coolant, a rise in the pressure in the exhaust passage 12 is suppressed. Consequently, a decrease in intake air amount GA caused by a rise in exhaust pressure can be restrained, allowing a decrease in the output torque of the internal combustion engine 10 to be suppressed.

Other Embodiments

The above embodiments may be modified as follows.

In the second embodiment and the third embodiment, when the abnormal flag or the turbine abnormal flag has been turned on, the wastegate valve 25 need not be driven to the full opening degree. That is, at this time, the opening degree control of the wastegate valve 25 may be performed depending on the operating state of the internal combustion engine 10.

In the embodiments, the processing in steps S107 to S109, step S111, and step S112 of the abnormality determination process (FIG. 4) may be omitted provided that erroneous determinations caused by a time delay after occurrence of the engine leakage abnormality and before a rise in the coolant temperature THW is properly suppressed.

In the embodiments, when occurrence of the turbine leakage abnormality is not detected (step S106: NO in FIG. 4), the actual flow rate Q2 detected by the flow rate sensor 17 may be learned as the basic flow rate Q0 suitable for the operating state of the internal combustion engine 10. Such an apparatus can provide a value appropriate for the actual state of the basic flow rate Q0, enabling accurate determination of the turbine leakage abnormality based on a comparison between the basic flow rate Q0 and the actual flow rate Q2.

In the embodiments, the abnormal flag may be turned on (step S107) when, in addition to the condition that "the basic flow rate Q0 is more than the actual flow rate Q2 by at least the determination amount" (step S106: YES in FIG. 4), the condition that "the amount of decrease in the actual flow rate Q2 per unit time is equal to or larger than a determination value." Then, the switching valves 41 and 42 may be switched to the second operation mode. In this regard, when the turbine leakage abnormality occurs, the actual flow rate Q2 decreases rapidly immediately after the occurrence. The above-described apparatus allows such a rapid decrease in the actual flow rate Q2 to be used as a condition for the determination of occurrence of the turbine leakage abnormality. Thus, it is possible to avoid erroneously determining that the turbine leakage abnormality has occurred when the actual flow rate Q2 decreases gradually in association with temporal changes. Consequently, occurrence of the turbine leakage abnormality can be accurately determined.

The embodiments are not limited to the adoption of the engine load KL, the engine speed NE, and the coolant temperature THW as calculation parameters used to calculate the basic flow rate Q0. Any values may be adopted provided that the values are related to the flow rate of coolant in the cooling system 30. For example, an intake temperature, an accelerator operation amount, a vehicle traveling speed, and the like may be adopted as the calculation parameters.

In the embodiments, as a method for detecting absence of the engine leakage abnormality, any detection method may be adopted provided that the detection method enables determination of an excessively high temperature of the internal combustion engine 10 resulting from degraded cooling performance caused by leakage of coolant from the engine coolant path 32 or determination of a high likelihood of the temperature becoming excessively high. As such a detection method, for example, the detection method 1 to the detection method 3 described below are possible. For example, a temperature at which overheating of the internal combustion engine 10 is determined may be set to be a determination temperature in the detection method 1 and the detection method 2.

Detection method 1: When the coolant temperature THW is equal to or higher than a determination temperature, occurrence of the engine leakage abnormality is detected. On the other hand, when the coolant temperature THW is lower than the determination temperature, absence of the engine leakage abnormality is detected.

Detection method 2: A temperature sensor that detects the temperature of the internal combustion engine 10 is provided. When the temperature of the internal combustion engine 10 detected by the temperature sensor is equal to or higher than a determination temperature, occurrence of the engine leakage abnormality is detected. On the other hand, when the temperature of the internal combustion engine 10 is lower than the determination temperature, absence of the engine leakage abnormality is detected.

Detection method 3: When the occurrence frequency of knocking of the internal combustion engine 10 is equal to or higher than a determination value, occurrence of the engine leakage abnormality is detected. On the other hand, when the occurrence frequency of knocking is lower than the determination value, absence of the engine leakage abnormality is detected.

In the embodiments, in conjunction with detection of absence of the engine leakage abnormality, absence of an abnormality in the temperature sensor 16 configured to detect the coolant temperature THW may be detected by a well-known method. Such an apparatus can avoid erroneously determining that the engine leakage abnormality is occurring as a result of an abnormality in the temperature sensor 16. Consequently, occurrence of the engine leakage abnormality can be accurately determined.

In the embodiments, as the amount of coolant used to determine whether the turbine leakage abnormality is occurring, instead of the flow rate of coolant itself, the pressure of coolant, which is an index value for the amount of coolant, may be used. In this regard, given that no coolant is leaking from the cooling system 30 while the switching valves 41 and 42 are in the first operation mode, the pressure of coolant supplied to the turbine coolant path 33 (basic pressure) is approximately equal to the pressure of coolant passing through the engine coolant path 32. The pressure of coolant passing through the engine coolant path 32 can be accurately estimated based on the operating state of the internal combustion engine 10. Thus, the basic pressure can also be accurately estimated based on the operating state of the internal combustion engine 10. Furthermore, occurrence of the turbine leakage abnormality reduces the pressure (actual pressure) of coolant flowing out to the coolant passage 35 after passing through the turbine coolant path 33. Consequently, when the actual pressure detected by a pressure sensor is lower than the basic pressure by at least a predetermined pressure, occurrence of the turbine leakage abnormality can be determined.

The above-described apparatus can determine whether the turbine leakage abnormality is occurring, for example, as follows. That is, instead of the flow rate sensor 17, a pressure sensor configured to detect the pressure of coolant is attached to a part of the coolant passage 35 positioned between the exhaust turbine 22 and the second switching valve 42. The pressure sensor may be attached to the vicinity of a coolant outlet of the turbine coolant path 33. In this apparatus, the pressure sensor corresponds to an outflow amount sensor.

Figure 9:
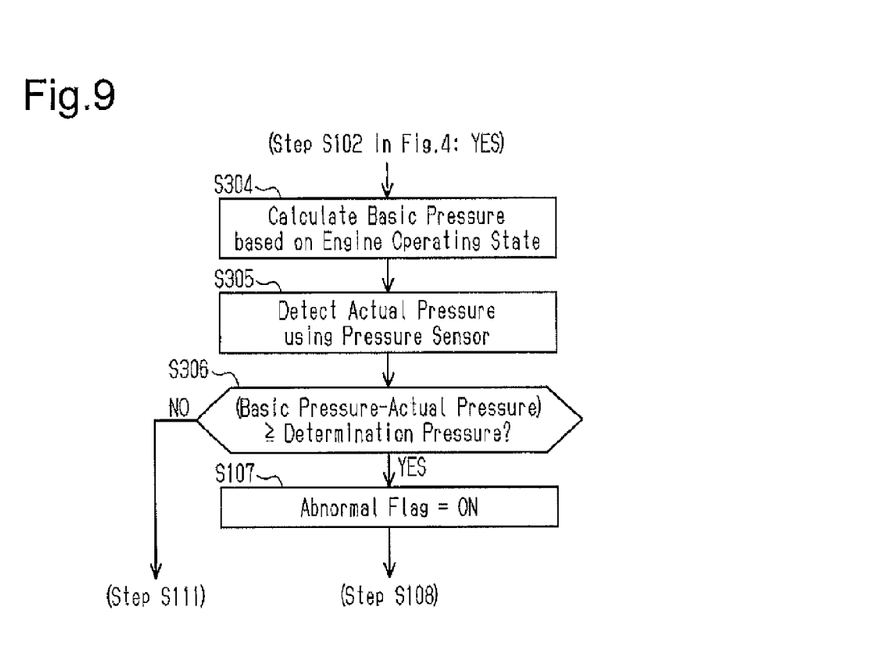
FIG. 9 is a flowchart depicting an execution procedure for an abnormality determination process according to another embodiment.

FIG. 9 depicts an execution procedure for an abnormality determination process according to a modification. The same processes in FIG. 9 as the corresponding abnormality determination processes in FIG. 4 described above are denoted by the same reference numerals and will not be described in detail. As depicted in FIG. 9, when absence of the engine leakage abnormality is detected in the abnormality determination process (step S102: YES in FIG. 4), the basic pressure is calculated based on the operating state of the internal combustion engine 10 (step S304 in FIG. 9). Furthermore, the actual pressure is detected by the pressure sensor (step S305). Then, when the basic pressure is higher than the actual pressure by at least a determination pressure (step S306: YES), the turbine leakage abnormality is likely to be occurring, and thus, the abnormal flag is turned on (step S107). On the other hand, when the difference between the basic pressure and the actual pressure (basic pressure−actual pressure) is less than the determination pressure (step S306: NO), the processing in step S111 and the subsequent steps is executed.

In the embodiments, whether the turbine leakage abnormality is occurring is determined based on the flow rate of coolant. However, whether the turbine leakage abnormality is occurring may be determined based on the exhaust pressure or the exhaust flow rate. When coolant leaks from the turbine coolant path 33, resultant degradation of the cooling performance of the cooling system 30 causes the supercharging performance of the turbocharger 20 to be deteriorated. This leads to a decrease in the exhaust pressure or exhaust flow rate of the internal combustion engine 10. Furthermore, when coolant leaks from the turbine coolant path 33 to the exhaust passage 12, the coolant evaporates in the exhaust passage 12 to increase the internal pressure (exhaust pressure) of the exhaust passage 12 or increase the flow rate of gas (exhaust flow rate) flowing through the exhaust passage 12. In contrast, given that no coolant is leaking from the turbine coolant path 33, the exhaust pressure (basic exhaust pressure) or exhaust flow rate (basic exhaust flow rate) of the internal combustion engine 10 can be accurately estimated based on the operating state of the internal combustion engine 10 (engine load KL and engine speed NE). Thus, occurrence of the turbine leakage abnormality may be determined when the actual exhaust pressure detected by the pressure sensor is higher than the basic exhaust pressure by at least a first predetermined pressure or lower than the basic exhaust pressure by at least a second predetermined pressure. Additionally, occurrence of the turbine leakage abnormality may be determined when the actual exhaust flow rate detected by the flow rate sensor is more than the basic exhaust flow rate by at least a first predetermined amount or less than the basic exhaust flow rate by at least a second predetermined amount.

An apparatus that determines whether the turbine leakage abnormality is occurring based on the exhaust pressure will be described below. In this apparatus, the pressure sensor configured to detect the exhaust pressure is attached to a part of the exhaust passage 12 positioned on the downstream side of the exhaust turbine 22 in the exhaust flow direction. The pressure sensor may be attached to a part of the exhaust passage 12 positioned on the upstream side of the exhaust turbine 22 in the exhaust flow direction.

Figure 10:
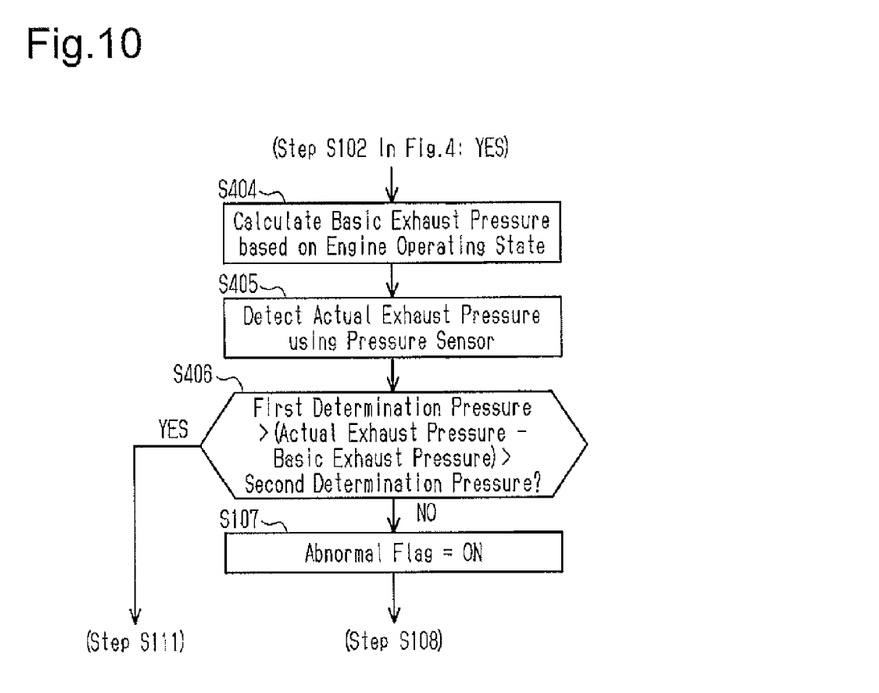
FIG. 10 is a flowchart depicting an execution procedure for an abnormality determination process according to another embodiment.

FIG. 10 depicts an execution procedure for an abnormality determination process according to a modification. The same processes in FIG. 10 as the corresponding abnormality determination processes in FIG. 4 described above are denoted by the same reference numerals and will not be described in detail. As depicted in FIG. 10, when absence of the engine leakage abnormality is detected in the abnormality determination process (step S102: YES in FIG. 4), the basic exhaust pressure is calculated based on the operating state of the internal combustion engine 10 (step S404 in FIG. 10). Furthermore, the actual exhaust pressure is detected by the pressure sensor (step S405). Then, when the difference between the actual exhaust pressure and the basic exhaust pressure (actual exhaust pressure−basic exhaust pressure) is equal to or higher than a first determination pressure or equal to or lower than a second determination pressure (step S406: NO), the turbine leakage abnormality is likely to be occurring, and thus, the abnormal flag is turned on (step S107). On the other hand, when the difference between the actual exhaust pressure and the basic exhaust pressure is lower than the first determination pressure and higher than the second determination pressure (step S406: YES), the processing in step S111 and the subsequent steps is executed.

In the embodiments, whether the turbine leakage abnormality is occurring is determined based on the flow rate of coolant. However, whether the turbine leakage abnormality is occurring may be determined based on the internal pressure (what is called the intake pressure) of the intake passage 11 or the intake air amount GA. When coolant leaks from the turbine coolant path 33, resultant degradation of the cooling performance of the cooling system 30 causes the supercharging performance of the turbocharger 20 to be deteriorated. This leads to a decrease in the intake pressure or the intake air amount GA. Furthermore, when coolant leaks from the turbine coolant path 33 to the exhaust passage 12, the coolant evaporates in the exhaust passage 12 to increase the exhaust pressure. Thus, the amount of exhaust gas discharged from the combustion chamber to the exhaust passage 12 decreases, reducing the amount of air drawn into the combustion chamber or increasing the intake pressure. In contrast, given that no coolant is leaking from the turbine coolant path 33, the intake pressure (basic intake pressure) or intake air amount (basic intake amount) of the internal combustion engine 10 can be accurately estimated based on the operating state of the internal combustion engine 10 (engine speed NE and the like). Thus, occurrence of the turbine leakage abnormality may be determined when the actual intake pressure detected by the pressure sensor is higher than the basic intake pressure by at least a third predetermined pressure or lower than the basic intake pressure by at least a fourth predetermined pressure. Additionally, occurrence of the turbine leakage abnormality may be determined when the actual intake air amount GA detected by an intake amount sensor is more than the basic intake amount by at least a third predetermined amount or less than the basic intake amount by at least a fourth predetermined amount.

An apparatus that determines whether the turbine leakage abnormality is occurring based on the intake pressure will be described below. In this apparatus, the pressure sensor configured to detect the intake pressure is attached to a part of the intake passage 11 positioned on the downstream side of the compressor 21 in the intake flow direction.

Figure 11:
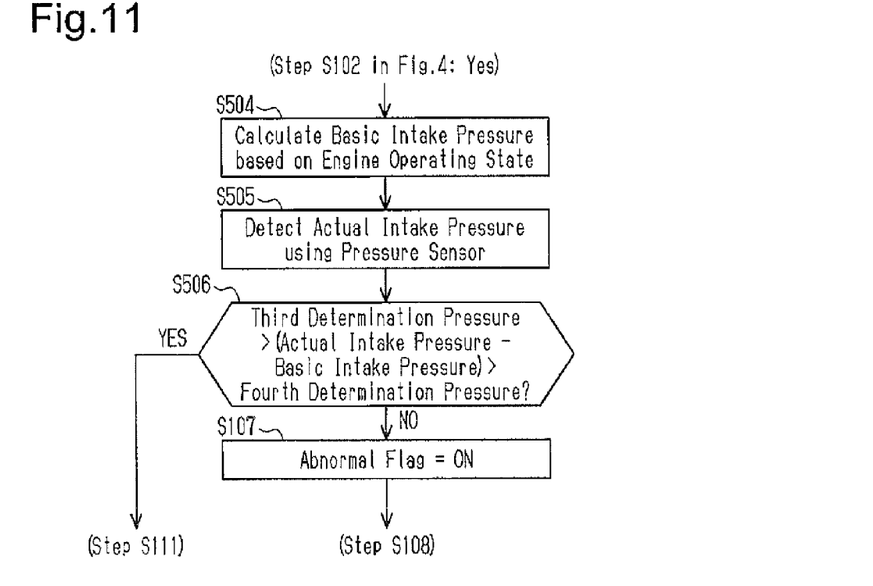
FIG. 11 is a flowchart depicting an execution procedure for an abnormality determination process according to another embodiment.

FIG. 11 depicts an execution procedure for an abnormality determination process according to a modification. The same processes in FIG. 11 as the corresponding abnormality determination processes in FIG. 4 described above are denoted by the same reference numerals and will not be described in detail. As depicted in FIG. 11, when absence of the engine leakage abnormality is detected in the abnormality determination process (step S102: YES in FIG. 4), the basic intake pressure is calculated based on the operating state of the internal combustion engine 10 (step S504 in FIG. 11). Furthermore, the actual intake pressure is detected by the pressure sensor (step S505). Then, when the difference between the actual intake pressure and the basic intake pressure (actual intake pressure−basic intake pressure) is equal to or higher than a third determination pressure or equal to or lower than a fourth determination pressure (step S506: NO), the turbine leakage abnormality is likely to be occurring, and thus, the abnormal flag is turned on (step S107). On the other hand, when the difference between the actual intake pressure and the basic intake pressure is lower than the third determination pressure and higher than the fourth determination pressure (step S506: YES), the processing in step S111 and the subsequent steps is executed.

In the embodiments, whether the turbine leakage abnormality is occurring is determined based on the flow rate of coolant. However, whether the turbine leakage abnormality is occurring may be determined based on one of the exhaust pressure and the exhaust flow rate and one of the intake pressure and the intake air amount.

In the embodiments, the switching valves 41 and 42 are switched to the second operation mode when the abnormal flag or the turbine abnormal flag has been turned on. In addition, the switching valves 41 and 42 may be switched to the second operation mode when the condition 1 and the condition 2 described below are both met.

Condition 1: The internal combustion engine 10 is warming up. Specifically, the coolant temperature THW is lower than a predetermined temperature.

Condition 2: The exhaust temperature is lower than a predetermined temperature.

In an engine system provided with the exhaust turbine 22, an exhaust system has a large heat capacity, and thus, the temperature of the exhaust purification apparatus 13 has difficulty in rising after the start of the internal combustion engine 10. This contributes to preventing the exhaust purification function of the exhaust purification apparatus 13 from being enhanced. Furthermore, the above-described embodiments are configured such that the turbine housing 23 of the exhaust turbine 22 is cooled by coolant. Thus, the rate at which the temperature of the exhaust purification apparatus 13 rises after the start of the engine is prone to be low.

In the above-described apparatus, when the exhaust temperature is low enough to prevent a possible abnormality in the cooling system 30 or the exhaust turbine 22 as a result of overheating while the internal combustion engine 10 is warming up, that is, while the temperature of the exhaust purification apparatus 13 is low, the switching valves 41 and 42 are switched to the second operation mode to stop the supply of coolant to the turbine coolant path 33. This enables a reduction in the degree to which exhaust gas is cooled upon passing through the exhaust turbine 22, a decrease in the exhaust temperature is suppressed and the temperature in the exhaust purification apparatus 13 can be increased promptly, allowing the exhaust purification function of the exhaust purification apparatus 13 to be enhanced. Besides the value detected by the temperature sensor provided in the exhaust passage 12, a value estimated based on the operating state of the internal combustion engine 10 (engine load KL and engine speed NE) may be used as the exhaust temperature.

Figure 12:
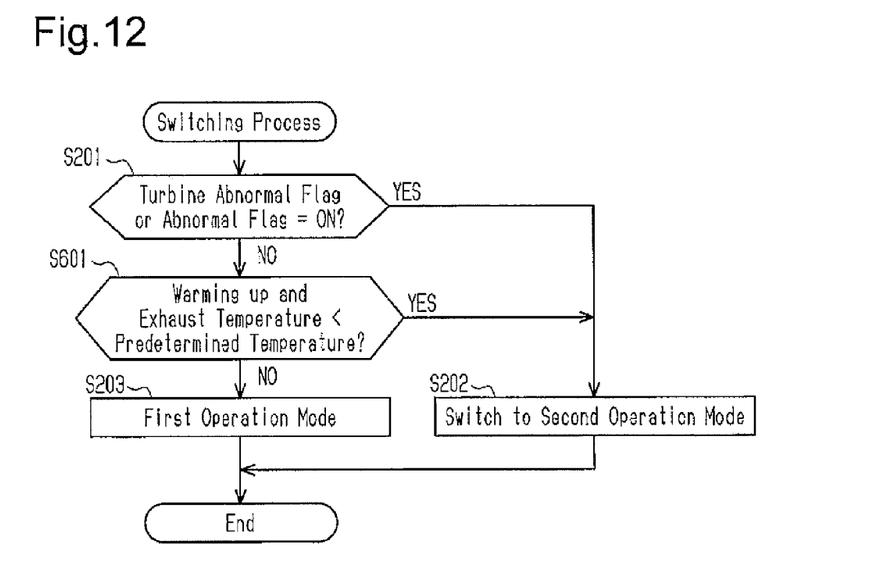
FIG. 12 is a flowchart depicting an execution procedure for a switching process according to another embodiment.

FIG. 12 depicts an execution procedure for a switching process according to a modification. As depicted in FIG. 12, in this process, when the abnormal flag or the turbine abnormal flag has been turned on (step S201: YES), the switching valves 41 and 42 are switched to the second operation mode (step S202). On the other hand, when the abnormal flag and the turbine abnormal flag are both turned off (step S201: NO), whether the (condition 1) and the (condition 2) are both met is determined (step S601). When the (condition 1) and the (condition 2) are both met (step S601: YES), the switching valves 41 and 42 are switched to the second operation mode (step S202). On the other hand, when at least one of the (condition 1) and the (condition 2) fails to be met (step S601: NO), the switching valves 41 and 42 are switched to the first operation mode (step S203).

The cooling apparatus described in the embodiments is not limited to the cooling apparatus in which the engine coolant path 32 and the turbine coolant path 33 are connected together in series. The cooling apparatus described in the embodiments is applicable to a cooling apparatus in which the engine coolant path, the turbine coolant path, and the engine cooling system are connected together in parallel. In the above-described apparatus, given that no coolant is leaking from the cooling system while the switching valves 41 and 42 are in the first operation mode, the flow state of coolant in the cooling system can be determined based on the operating state of the internal combustion engine 10. Thus, the amount of coolant supplied to the turbine coolant path (basic flow rate) can be accurately estimated based on the operating state of the internal combustion engine 10. Consequently, whether the turbine leakage abnormality is occurring can be determined by detecting the amount of coolant flowing out from the turbine coolant path (actual flow rate) by the outflow amount sensor and comparing the actual flow rate with the basic flow rate.

DESCRIPTION OF THE REFERENCE NUMERALS

10 Internal combustion engine
11 Intake passage
12 Exhaust passage
13 Exhaust purification apparatus
14 Electronic control apparatus
15 Crankshaft
16 Temperature sensor
17 Flow rate sensor
20 Turbocharger
21 Compressor
21A Compressor wheel
22 Exhaust turbine
22A Turbine wheel
23 Turbine housing
24 Communication path
25 Wastegate valve
26 Scroll passage
30 Cooling system
31 Water pump
32 Engine coolant path
33 Turbine coolant path
34 Radiator
35 Coolant passage
36 Coolant passage
37 Bypass water path
38 Thermostat valve
40 Bypass passage
41 First switching valve
42 Second switching valve
50 Passage
51 Differential pressure regulating valve
60 Passage
61 Differential pressure regulating valve
62 Separator

The invention claimed is:

1. A cooling apparatus for an engine system that includes an internal combustion engine and a turbocharger, the cooling apparatus comprising:
    a cooling system through which coolant circulates and which includes an engine coolant path formed inside the internal combustion engine and a turbine coolant path formed inside a housing of an exhaust turbine in the turbocharger;
    a switching section that is selectively switched to one of a first operation mode, in which coolant in the cooling system is permitted to flow through the engine coolant path and the turbine coolant path, and a second operation mode, in which the coolant in the cooling system is permitted to flow only through the engine coolant path, while not being permitted to flow through the turbine coolant path;
    a supply amount estimation section that estimates an amount of coolant supplied to the turbine coolant path based on an operating state of the internal combustion engine;
    an outflow amount sensor that detects an amount of coolant flowing out from the turbine coolant path; and
    a control section that switches the switching section to the second operation mode when the operation mode of the switching section is the first operation mode and the amount of coolant estimated by the supply amount estimation section is larger than the amount of coolant detected by the outflow amount sensor by at least a preset determination amount.

2. The cooling apparatus for an engine system according to claim 1, further comprising a detection section that detects that an abnormality is not occurring in which coolant leaks from the engine coolant path,
   wherein the control section switches to the second operation mode on condition that the detection section detects that the abnormality is not occurring.

3. The cooling apparatus for an engine system according to claim 2, further comprising a temperature sensor that detects a temperature of coolant flowing out from the engine coolant path, wherein
   the detection section detects that the abnormality is not occurring when an increase rate of the temperature detected by the temperature sensor is kept equal to or lower than a determination rate, and
   when the increase rate exceeds the determination rate, the detection section detects that the abnormality is subsequently occurring.

4. A controlling method for controlling a cooling apparatus for an engine system including an internal combustion engine and a turbocharger, wherein the cooling apparatus includes:
   a cooling system through which coolant circulates and which includes an engine coolant path formed inside the internal combustion engine and a turbine coolant path formed inside a housing of an exhaust turbine in the turbocharger; and
   a switching section that is selectively switched to one of a first operation mode, in which coolant in the cooling system is permitted to flow through the engine coolant path and the turbine coolant path, and a second operation mode, in which the coolant in the cooling system is permitted to flow only through the engine coolant path, while not being permitted to flow through the turbine coolant path,
   the controlling method comprising:
   estimating an amount of coolant supplied to the turbine coolant path based on an operating state of the internal combustion engine;
   detecting an amount of coolant flowing out from the turbine coolant path; and
   switching the switching section to the second operation mode when the operation mode of the switching section is the first operation mode and the amount of coolant supplied to the turbine coolant path is larger than the amount of coolant flowing out from the turbine coolant path by at least a preset determination amount.

5. The controlling method according to claim 4, further comprising detecting that an abnormality is not occurring in which coolant leaks from the engine coolant path,
   wherein a condition for switching the switching section to the second operation mode includes detection absence of the abnormality.

* * * * *